United States Patent
Leng et al.

(10) Patent No.: US 11,025,491 B2
(45) Date of Patent: Jun. 1, 2021

(54) SYSTEMS AND METHODS FOR CONFIGURATION VERIFICATION ACROSS SECURED NETWORK BOUNDARIES

(71) Applicant: Google LLC, Mountain View, CA (US)

(72) Inventors: Xi Leng, Mountain View, CA (US); Timothy Olds, Mountain Veiw, CA (US)

(73) Assignee: Google LLC, Mountain View, CA (US)

( * ) Notice: Subject to any disclaimer, the term of this patent is extended or adjusted under 35 U.S.C. 154(b) by 52 days.

(21) Appl. No.: 16/342,438

(22) PCT Filed: Jan. 27, 2017

(86) PCT No.: PCT/US2017/015451
§ 371 (c)(1),
(2) Date: Apr. 16, 2019

(87) PCT Pub. No.: WO2018/125268
PCT Pub. Date: Jul. 5, 2018

(65) Prior Publication Data
US 2019/0253318 A1 Aug. 15, 2019

Related U.S. Application Data

(60) Provisional application No. 62/441,022, filed on Dec. 30, 2016.

(51) Int. Cl.
G06F 15/173 (2006.01)
H04L 12/24 (2006.01)
(Continued)

(52) U.S. Cl.
CPC .......... H04L 41/0853 (2013.01); H04L 12/46 (2013.01); H04L 41/0866 (2013.01);
(Continued)

(58) Field of Classification Search
CPC ..... H04L 63/20; H04L 67/2804; H04L 43/50; H04L 41/5025; H04L 41/0869;
(Continued)

(56) References Cited

U.S. PATENT DOCUMENTS 6,530,065 B1 * 3/2003 McDonald ............ G06F 30/367
716/102
2007/0239469 A1 10/2007 Minnis et al.

OTHER PUBLICATIONS

Examination Report for EP Appln. Ser. No. 17705516.7 dated May 8, 2020 (4 pages).
(Continued)

Primary Examiner — Wing F Chan
Assistant Examiner — Andrew Woo
(74) Attorney, Agent, or Firm — Foley & Lardner LLP

(57) ABSTRACT

Systems and methods are described for testing server configuration across a secured network edge. A server administrator submitting configuration instructions from an external network separated from an internal network by a network boundary device may not have adequate access for proper testing. A test platform within the internal network receives, from a management device in the external network, a test request indicating a client characteristic. The test platform generates a data request with origination information for a source of the data request conforming to the indicated client characteristic and transmits the generated data request to a data server within the internal network responsive to receiving the test request from the management device. The test platform then receives a response to the generated data request and provides, to the management device in the external network, a report based on the received response.

20 Claims, 5 Drawing Sheets

(51) Int. Cl.
 *H04L 12/26* (2006.01)
 *H04L 12/46* (2006.01)
(52) U.S. Cl.
 CPC ............... *H04L 41/22* (2013.01); *H04L 43/50* (2013.01); *H04L 43/08* (2013.01)
(58) Field of Classification Search
 CPC ............... H04L 41/145; H04L 41/0806; H04L 41/0866; H04L 43/00; H04L 67/308
 USPC .................................................. 709/201, 203
 See application file for complete search history.

(56) References Cited

OTHER PUBLICATIONS

International Preliminary Report on Patentability on Appln. Ser. No. PCT/US2017/015451 dated Jul. 11, 2019 (7 pages).
International Search Report and Written Opinion on Appln. Ser. No. PCT/US2017/015451 dated Sep. 6, 2017 (12 pages).

* cited by examiner

SYSTEMS AND METHODS FOR CONFIGURATION VERIFICATION ACROSS SECURED NETWORK BOUNDARIES

CROSS REFERENCES TO RELATED APPLICATIONS

This application claims the benefit of priority to U.S. Patent Application No. 62/441,022, titled "Systems and Methods for Configuration Verification across Secured Network Boundaries," filed Dec. 30, 2016, which is hereby incorporated by reference herein in its entirety.

BACKGROUND

Data servers in a network may be generally configured to respond to requests received over the network from one or more network devices, e.g., client devices such as other servers, desktops, laptops, and mobile devices such as "smart" telephones and tablets. The network may encompass multiple networks (or "sub-networks") which meet at network edges. Data transferring from one network to another may pass through one or more gateway devices that handle routing tasks and enforce local network rules. In some instances, a data server may be configured by a third-party to provide responses in accordance with a configuration. However, a computing device used to manage the configuration may be in a first network, separated from a second network hosting the data server by at least one such gateway device. This can restrict the level of control and access available for management and configuration of the data server.

SUMMARY

To provide configuration verification across secured network boundaries, a data server managed from a first network but hosted by a second network can be configured by a management device in the first network. However, to test the configuration, the management device might submit test requests as though it were a client device, or an administrator might use an actual client device, e.g., a client device in yet another, third, network to submit test requests. These test requests necessarily interact with the data server in the same manner as any other non-test request. In some instances, this is not desirable because the test requests become "real" requests, which may incur financial costs and interfere with accounting or statistics gathering, as well as potentially unnecessarily consuming processing resources. Furthermore, if the data server is not properly configured, it can be risky to have the data server using an improper configuration to field real requests. In some implementations described herein, the data server (or an administrative server) provides a configuration testing interface that gives an outside administrator limited inside access to the data server to facilitate configuration verification.

In particular, systems and methods are described for testing server configurations across a secured network edge. A server administrator submitting configuration instructions from an external network separated from an internal network by a network boundary device may not have adequate access for proper testing. A test platform within the internal network receives, from a management device in the external network, a test request indicating a client characteristic. The test platform generates a data request with origination information for a source of the data request conforming to the indicated client characteristic and transmits the generated data request to a data server within the internal network responsive to receiving the test request from the management device. The test platform then receives a response to the generated data request and provides, to the management device in the external network, a report based on the received response.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

Following below are more detailed descriptions of various concepts related to, and implementations of, methods, apparatuses, and systems relating to configuration verification across secured network boundaries. The various concepts introduced above and discussed in greater detail below may be implemented in any of numerous ways, as the described concepts are not limited to any particular manner of implementation.

In particular, the present disclosure relates to systems and methods for configuration verification across secured network boundaries. A data server managed from a first network but hosted by a second network can be configured by a management device in the first network. However, to test the configuration, the management device might submit test requests as though it were a client device, or an administrator might use an actual client device, e.g., a client device in yet another, third, network to submit test requests. These test requests necessarily interact with the data server in the same manner as any other non-test request. In some instances, this is not desirable because the test requests become "real" requests, which may incur financial costs and interfere with accounting or statistics gathering, as well as potentially unnecessarily consuming processing resources. Furthermore, if the data server is not properly configured, it can be risky to have the data server using an improper configuration to field real requests. In some implementations described herein, the data server (or an administrative server) provides a configuration testing interface that gives an outside administrator limited inside access to the data server to facilitate configuration verification.

Figure 1A:
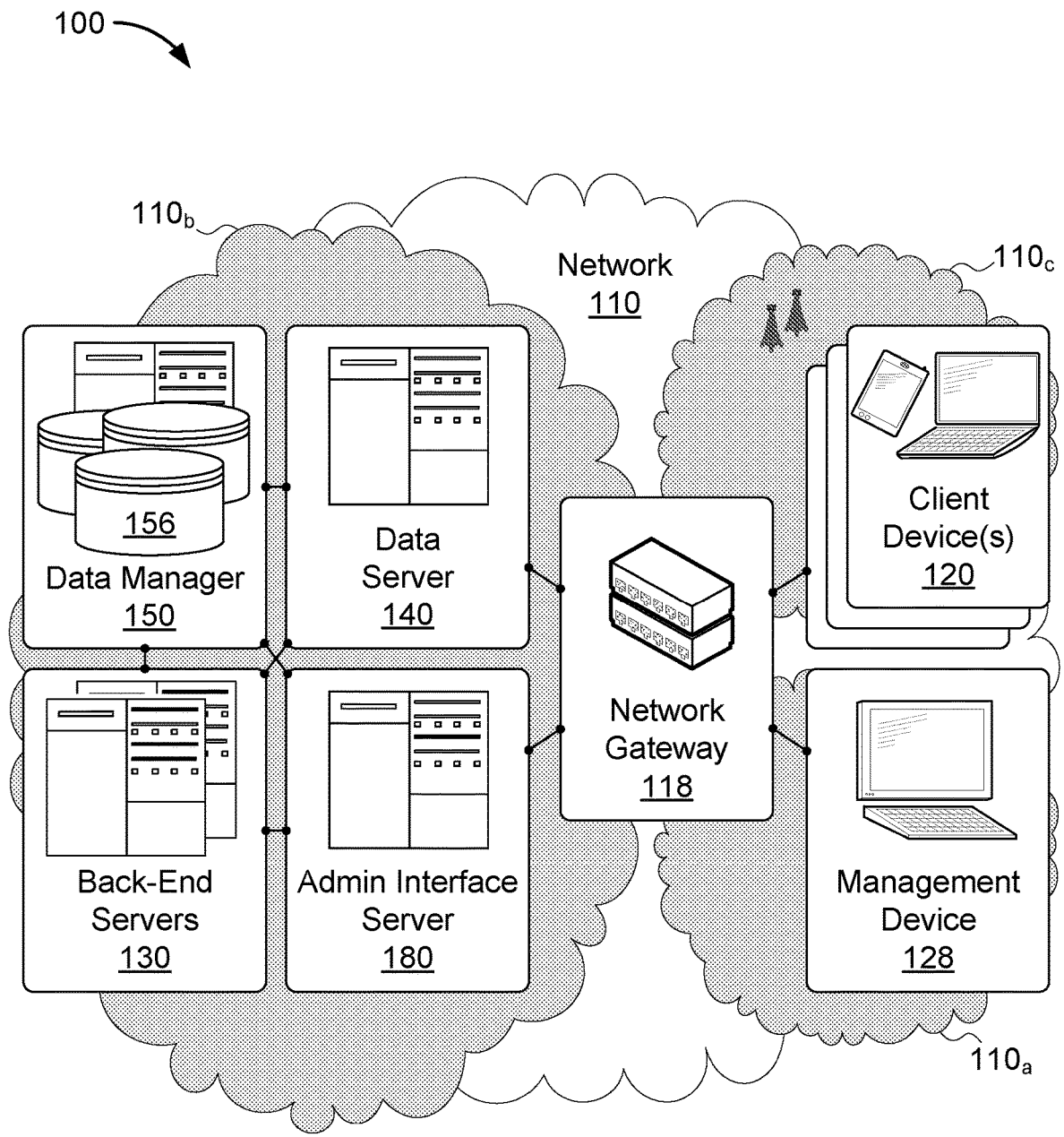
FIG. 1A is a diagram of an example configurable data server platform in an example network environment.
Figure 1B:
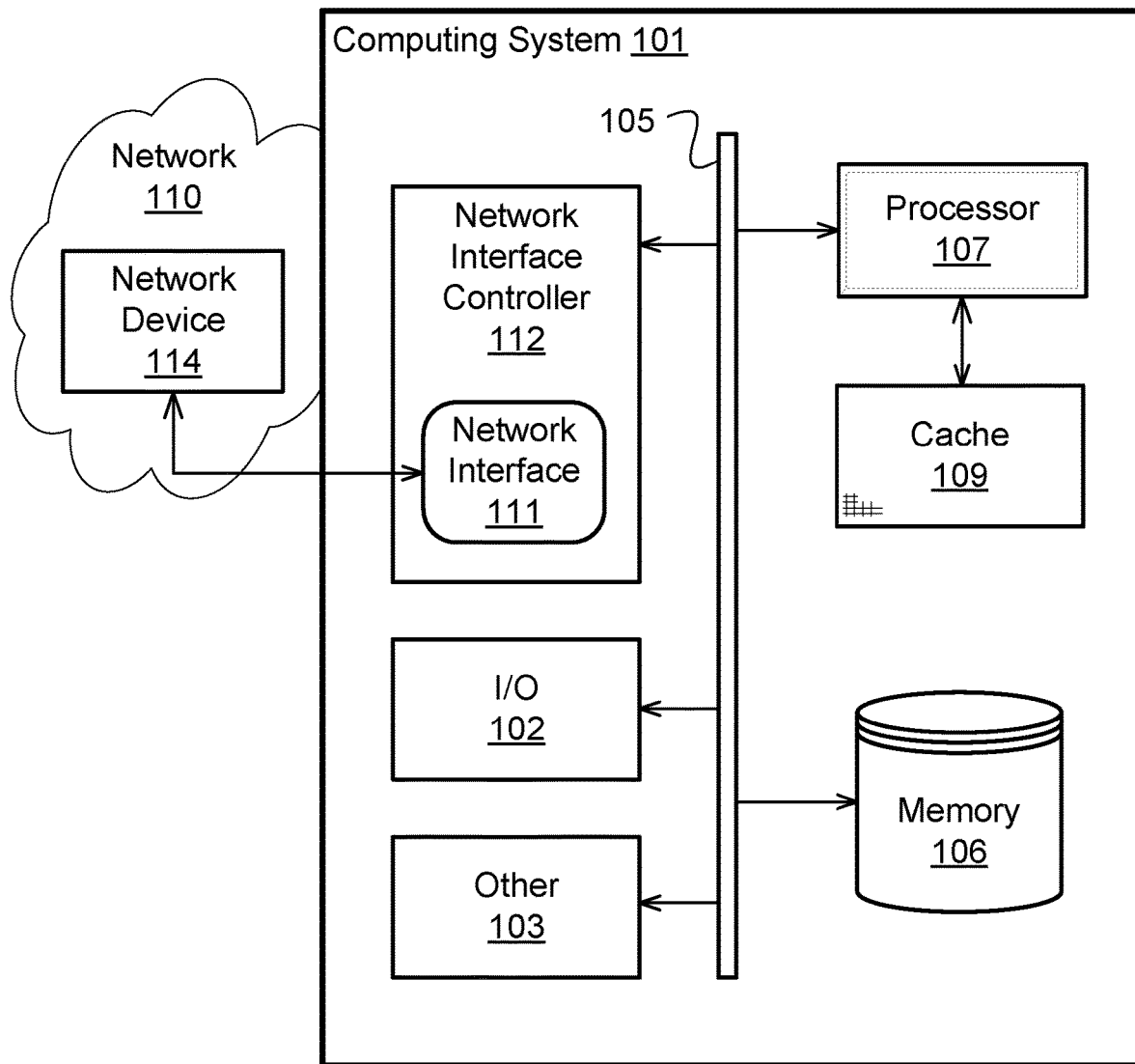
FIG. 1B is a block diagram illustrating an example computing device suitable for use in the various implementations described herein.

FIG. 1A is a diagram of an example configurable data server platform in an example network environment 100. In broad overview of FIG. 1A, the example network environment 100 includes a data server 140 that provides data to one or more client device(s) 120 over a network 110 in accordance with configuration settings administered at the management device 128. The data server 140 is part of a data server platform that includes various back-end servers 130, the data server 140, a data manager 150 (for access to data storage 156), and an administrative interface server 180. In some implementations, one or more of the data server 140, the data manager 150, and the administrative interface server 180 are examples of back-end servers 130. In some implementations, the data server platform servers (e.g., the back-end servers 130) participate in a server farm or in a distributed content delivery network ("CDN"). FIG. 1B, described in more detail below, illustrates a computing device 101 that, in corresponding configurations, is suitable for use as the network gateway 118, the client device 120, the management device 128, the back-end server 130, the data server 140, the data manager 150, and/or the administrative interface server 180 shown in FIG. 1A.

Referring to FIG. 1A in more detail, the illustrated network 110 includes three sub-networks or autonomous system ("AS") networks labeled as network 110a, network 110b, and network 110c. An autonomous system ("AS") is a network that operates under a consistent unified routing policy (or at least appears to from outside the AS network) and is generally managed by a single administrative entity (e.g., a system operator, administrator, or administrative group). Although shown as meeting at a single network boundary represented by the network gateway 118, the various sub-networks or AS networks (i.e., networks 110a, 110b, and 110c) within the network 110 may meet at one or more of: an additional intervening network (a "transit network"), a point of presence ("POP"), an Internet eXchange Point ("IXP"), and/or additional other network boundaries not shown. In the illustrated example network environment 100, the first network, network 110a, hosts a management device 128 and may be referred to as the third-party network or the third-party management network. The second network, network 110b, hosts various back-end servers 130 for the data server platform. From the perspective of the data server platform and its component back-end server 130, the second network 110b is an "internal" network while the first network 110a and the third network 110c are "external" networks. The third network, network 110c, hosts one or more client devices 120.

As described in more detail herein, the data server 140 provides data to the client devices 120 in accordance with configuration settings administered at the management device 128. Because the management device 128 is in a first network 110a, the data server 140 is in a second network 110b, and the client devices 120 are in a third network 110c, and because each network 110a, 110b, and 110c is separated by at least a network boundary such as the network gateway 118, there are network and security constraints on how the management device 128 can verify the configuration.

The network 110 enables communication between the various illustrated computing devices, including, e.g., communication between the data server 140 and the client devices 120, and communication between the management device 128 and the administrative interface server 180. In some implementations, data flows through the network 110 from a source node to a destination node as a flow of data packets, e.g., in the form of data packets in accordance with the Open Systems Interconnection ("OSI") layers. A flow of packets may use, e.g., an OSI layer-4 transport protocol such as the User Datagram Protocol ("UDP"), the Transmission Control Protocol ("TCP"), or the Stream Control Transmission Protocol ("SCTP"), transmitted via the network 110 layered over an OSI layer-3 network protocol such as Internet Protocol ("IP"), e.g., IPv4 or IPv6. The network 110 is composed of various network devices ("nodes") linked together to form one or more data communication paths between participating devices. Each networked device includes at least one network interface for receiving and/or transmitting data, typically as one or more data packets. An illustrative network 110 is the Internet; however, other networks may be used. The network 110 may be composed of multiple connected sub-networks (e.g., network 110a, network 110b, and network 110c). The network 110 can be a local-area network (LAN) such as a company intranet, a metropolitan area network (MAN), a wide area network (WAN), an inter network such as the Internet, or a peer-to-peer network, e.g., an ad hoc WiFi peer-to-peer network. The data links between nodes in the network 110 may be any combination of wired links (e.g., fiber optic, mesh, coaxial, twisted-pair such as Cat-5 or Cat-6, etc.) and/or wireless links (e.g., radio, satellite, microwave, etc.). The network 110 may include carrier networks for mobile communication devices, e.g., networks implementing wireless communication protocols such as the Global System for Mobile Communications ("GSM"), Code Division Multiple Access ("CDMA"), Time Division Synchronous Code Division Multiple Access ("TD-SCDMA"), Long-Term Evolution ("LTE"), or any other such protocol including, but not limited to, so-called generation "3G," "4G," and "5G" protocols. The network 110 may include short-range wireless links, e.g., via WiFi, BLUETOOTH, or ZIGBEE, sometimes referred to as a personal area network ("PAN") or mesh network. The networks 110, 110a, 110b, and 110c may each be public, private, or a combination of public and private networks. Each of the networks 110, 110a, 110b, and 110c may be any type and/or form of data network and/or communication network.

The network gateway 118 is a network device connecting networks together at a network boundary. In some implementations, the network gateway 118 is at a POP, IXP, or at another type of interlinking or peering center. In some implementations, the network gateway 118 is a dual-homed network device. In some implementations, the network gateway 118 is computing system that includes one or more network interface controllers and a plurality of network interfaces. Examples of a network gateway 118 include, but are not limited to, network bridges, hubs, switches, routers, network address translators, and firewalls. In some implementations, the network gateway 118 is a remote-configurable network device, e.g., in a software-defined network ("SDN"). In some such implementations, the network gateway 118 includes a dedicated interface for receiving control instructions on a dedicated control plane. In some implementations, the network gateway 118 implements one or more routing protocols such as the Border Gateway Protocol ("BGP"). In some implementations, the network gateway 118 is configured to implement a routing policy. In some implementations, the network gateway 118 is configured to inspect incoming packets and filter or re-direct incoming or outgoing packets in accordance with a network configuration. In some implementations, the network gateway 118 includes buffer memory for holding incoming packets prior to retransmission. In some implementations, an overwhelmed network gateway 118 will receive more incoming packets than can be held by the buffer memory and may be configured to discard packets in accordance with a prioritization policy (e.g., dropping last-in or first-in packets). In some implementations, the network gateway 118 includes a ternary content-addressable memory ("TCAM"). In some implementations, the network gateway 118 accepts incoming packets from one network and retransmits the packets out to a second network. In retransmitting the packets, the network gateway 118 provides compatibility between the networks by adjusting transmission speeds, converting between network protocols, adding or removing codes, and/or enforcing security policies. In some implementations, the network gateway 118 is implemented using special purpose logic circuitry, e.g., an application specific integrated circuit ("ASIC"). In some implementations, the network gateway 118 is implemented using a system on a chip ("SoC") semiconductor device that includes at least one processor (or microprocessor) core. In some implementations, the network gateway 118 is implemented using a general purpose computing processor. FIG. 1B, described in more detail below, illustrates a computing device 101 that, in some configurations, is suitable for use as a network gateway 118.

The client device 120 is a computing system, or processor-based device, that executes applications, presents output to a user, and receives input from the user. The client device 120 is capable of exchanging information with network nodes, computers, devices, and/or servers (e.g., the data server 140) via the network 110. The client device 120 may be any kind of computing device, including, e.g., a desktop computer, a laptop or notepad computer, a mobile device such as a tablet or electronic pad, a personal digital assistant, or a smart phone, a video gaming device, a television or television auxiliary box (also known as a "set-top box"), a kiosk, a thin client, a hosted virtual desktop, or any other such device capable of exchanging information via the network 110. In some implementations, the client device 120 includes one or more hardware elements for facilitating data input and data presentation, e.g., a keyboard, a display, a touch screen, a microphone, a speaker, and/or a haptic feedback device. In some implementations, the client device 120 includes buttons, e.g., function-specific buttons (e.g., audio device volume controls such as volume up, volume down, mute, etc.) and/or function-agnostic buttons (e.g., a "soft" button that can be assigned specific functionality at a software level). In some implementations, the client device 120 includes a sensor capable of detecting movement of the client device 120 itself, e.g., an inertial measurement unit ("IMU"), an accelerometer, gyroscope, or tilt-sensor. An accelerometer may be a single-axis or multi-axis accelerometer. In some implementations, the client device 120 is implemented using special purpose logic circuitry, e.g., an ASIC. In some implementations, the client device 120 is implemented using an SoC semiconductor device that includes at least one processor (or microprocessor) core. In some implementations, the client device 120 is implemented using a general purpose computing processor. FIG. 1B, described in more detail below, illustrates a computing device 101 that, in some configurations, is suitable for use as a client device 120.

In some implementations, the client device 120 runs an operating system managing execution of software applications on the client device 120, including one or more software applications capable of presenting content received from content server 170. In some implementations, the operating system is provided with the client device 120. In some implementations, the client device 120 executes a browser application (e.g., a web browser such as CHROME or FIREFOX) capable of receiving data formatted according to the suite of hypertext application protocols such as the Hypertext Transfer Protocol ("HTTP") and HTTP encrypted by Transport Layer Security ("HTTPS"). In some such implementations, the browser facilitates interaction with the data server platform, e.g., interacting with the data server 140 or the administrative interface server 180, in the form of one or more web pages. In some implementations, the browser application is provided with the client device 120. In some implementations, the client device 120 executes a custom application, e.g., a game or other application that interacts with the data server platform. Interactions between the custom application and the data server platform may use standard protocols such as HTTP and HTTPS, or may use application-specific protocols, e.g., a custom application-layer protocol implemented over a transport-layer protocol such as UDP, TCP, or SCTP. In some implementations, the client device 120 includes a tool for obtaining and/or installing the custom application on the client device 120. In some implementations, one or more of the servers with which the client device 120 communicates supports a custom instruction set, e.g., an application programming interface ("API"), and the custom application executed on the client device 120 implements the API. An application can implement an API using, e.g., a library or software development kit ("SDK") provided to the application's developer.

The management device 128 is a computing system, or processor-based device, that executes applications, presents output to a user (e.g., an account manager or administrator), and receives input from the user. In some implementations, the management device 128 in an instance of a client device 120. In some implementations, the management device 128 receives data from an administrative interface server 180 and uses the received data to provide a management or administrative interface at the management device 128. In some implementations, the management device 128 executes a browser application (e.g., a web browser such as CHROME or FIREFOX) capable of receiving data formatted according to the suite of hypertext application protocols such as HTTP or HTTPS. In some such implementations, the browser facilitates interaction with the data server platform, e.g., interacting with the data server 140 or the administrative interface server 180, in the form of one or more web pages. In some implementations, the administrative interface server 180 provides an interface to the management device 128 in the form of a web page or set of web pages for presentation at the management device 128 by a browser application or by a custom application.

The back-end servers 130 are computing systems, or processor-based devices. The back-end servers 130 are capable of exchanging information with network nodes, computers, devices (e.g., the client devices 120), and/or other servers (e.g., the data server 140) via the network 110 or 110b. Each back-end server 130 may be any kind of computing device. In some implementations, one or more of the back-end servers 130 are hypervisors or other virtual machine hosts. In some implementations, one or more of the back-end servers 130 are "headless" and do not include hardware elements for direct data input and/or data presentation. In some implementations, one or more of the back-end servers 130 are implemented using special purpose logic circuitry, e.g., an ASIC. In some implementations, one or more of the back-end servers 130 are implemented using an SoC semiconductor device that includes at least one processor (or microprocessor) core. In some implementations, one or more of the back-end servers 130 are implemented using a general purpose computing processor. FIG. 1B, described in more detail below, illustrates a computing device 101 that, in some configurations, is suitable for use as a back-end server 130.

The data server platform may include any number of back-end servers 130, including but not limited to specific data server 140, the data manager 150, and the administrative interface server 180. In some implementations, the back-end servers 130 include various ones of: host servers, web servers, e-mail servers, file transfer protocol ("FTP") servers, media streaming servers, client interface servers, software interface servers, administrative servers, test servers, emulation servers, network controllers, and databases. In some implementations, one or more back-end servers 130 provide a redundant back-up to one or more other back-end servers 130 in the data server platform.

The data server 140 is an example back-end server 130 that is configured to provide ("serve") data. In some implementations, the data server 140 includes one or more network interface controllers and one or more network interfaces. In some implementations, the data server 140 provides data responsive to a specific request for the data. In some implementations, the data server 140 selects data to be provided. In some implementations, the data server 140 obtains data to be provided from a data manager 150. In some implementations, the data server 140 transmits data to a client device 120, across a network boundary, e.g., via the network gateway 118. In some such implementations, the data server 140 transmits the data to the client device 120 using a standard Open Systems Interconnection ("OSI") layer-4 transport protocol such as the User Datagram Protocol ("UDP"), the Transmission Control Protocol ("TCP"), or the Stream Control Transmission Protocol ("SCTP"). In some implementations, the data server 140 transmits the data to the client device 120 using a custom protocol, e.g., an application later protocol layered on UDP, TCP, or SCTP.

In some implementations, the data server 140 is implemented using special purpose logic circuitry, e.g., an ASIC. In some implementations, the data server 140 is implemented using an SoC semiconductor device that includes at least one processor (or microprocessor) core. In some implementations, the data server 140 is implemented using a general purpose computing processor. FIG. 1B, described in more detail below, illustrates a computing device 101 that, in some configurations, is suitable for use as a data server 140.

The data manager 150 provides data storage and management services for persisting data in memory 156. The memory 156 may be implemented using one or more data storage devices. The data storage devices may be any memory device suitable for storing computer readable data. The data storage devices may include a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or BLU-RAY discs). Example implementations of suitable data storage devices include storage area networks ("SAN"), network attached storage ("NAS"), and redundant storage arrays.

The data manager 150 controls access to the memory 156. In some implementations, the data manager 150 hosts a query engine. In some implementations, the data manager 150 hosts a relational database, e.g., using a Relational Database Management System ("RDBMS"). In some implementations, the data manager 150 manages data in the memory 156 as files, e.g., XML files. In some implementations, the data manager 150 regulates access to data or features using credentials or account management utilities. In some such implementations, credential or account information is stored by the data manager 150 in the memory 156.

A database, or more specifically a database management system ("DBMS"), organizes data in accordance with a database definition, e.g., a database schema. In a basic relational database, the DBMS maintains data in a table-like data structure. Each table has columns, each corresponding to an entry type, classification, or purpose. A table might have a column for numerical data, a column for text data (e.g., a description of the numerical data), a column for date data, and so forth. In a relational database, each entry in a column in a table is also in a row associating the entry with entries from other columns in the table. In some instances, an entry will associate a row from one table with one or more rows in another table. In some DBMS implementations, virtual tables called "views" represent data pulled from one or more tables as though it, too, were a table (that is, the view looks to a database client or user as though it was a table, but is not necessarily stored as such). Other types of database management systems can also be used, including various types of relational databases, object oriented databases, document oriented databases, XML databases, NoSQL databases, and so forth. Many of these database types use tables, or table-like structures, in a manner similar to that described above in reference to relational databases. A client or user of a database can add data to, modify data in, or retrieve data from the database using database instructions, e.g., queries in a database query language such as the Structured Query Language ("SQL"). One or more database instructions may be grouped together into a database transaction. Traditionally, a database provides transaction atomicity, consistency, isolation, and durability. These properties are known by the acronym "ACID." In some implementations, the data manager 150 provides a knowledge base with all of the ACID properties. However, in some implementations, the data manager 150 does not provide all of the ACID properties.

In some implementations, one or more of servers, e.g., the data server 140 and the administrative interface server 180, are in communication with the data manager 150, e.g., via a direct link or the network 110b. In some implementations, one or more of the servers obtain data from the data manager 150 using queries in a formal query language such as Structured Query Language ("SQL"), Hyper Text Structured Query Language ("HTSQL"), Contextual Query Language ("CQL"), Data Mining Extensions ("DMX"), or XML Query ("XQuery"). In some implementations, one or more of the servers obtain data from the data manager 150 using an inter-process communication architecture such as the Common Object Request Broker Architecture ("CORBA"), Remote Procedure Calls ("RPC"), Object Linking and Embedding ("OLE"), Component Object Model ("COM"), or Distributed Component Object Model ("DCOM"). In some implementations, one or more of the servers obtain data from the data manager 150 using natural language or semantic queries. In some implementations, one or more of the servers obtain data from the data manager 150 using queries in a custom query language such as a Visualization API Query Language.

In some implementations, the data manager 150 is implemented using special purpose logic circuitry, e.g., an ASIC. In some implementations, the data manager 150 is implemented using an SoC semiconductor device that includes at least one processor (or microprocessor) core. In some implementations, the data manager 150 is implemented using a general purpose computing processor. FIG. 1B, described in more detail below, illustrates a computing device 101 that, in some configurations, is suitable for use as a data manager 150.

The administrative interface server 180 is an example back-end server 130 that presents an interface to a management device 128 for management or administration of one or more aspects of the data server platform. The management device 128 may provide credentials corresponding to an account with authorization to distribute data from the data server platform in accordance with a configuration or policy. In some implementations, the administrative interface server 180 authenticates the provided credentials. In some implementations, the administrative interface server 180 accepts configuration instructions from the management device 128, contingent on authenticated credentials, via the interface. In some implementations, the administrative interface server 180 provides the interface to the management device 128 in the form of a web page or set of web pages for presentation at the management device 128 by a browser application or by a custom application. In some implementations, the administrative interface server 180 obtains data for the interface from the data manager 150. In some implementations, the administrative interface server 180 records data (e.g., configuration data) received through the interface using the data manager 150.

In some implementations, the administrative interface server 180 includes one or more network interface controllers and one or more network interfaces ("ports"). In some implementations, the administrative interface server 180 transmits data to a client device 120 or management device 128 via a network gateway 118. In some such implementations, the administrative interface server 180 transmits the data to the client device 120 using a standard OSI layer-4 transport protocol such as UDP, TCP, or SCTP. In some implementations, the administrative interface server 180 transmits the data to the client device 120 using a custom protocol, e.g., an application later protocol layered on UDP, TCP, or SCTP.

In some implementations, the administrative interface server 180 is implemented using special purpose logic circuitry, e.g., an ASIC. In some implementations, the administrative interface server 180 is implemented using a SoC semiconductor device that includes at least one processor (or microprocessor) core. In some implementations, the administrative interface server 180 is implemented using a general purpose computing processor. FIG. 1B, described in more detail below, illustrates a computing device 101 that, in some configurations, is suitable for use as a administrative interface server 180.

In some implementations, the administrative interface server 180 receives instructions from a management device 128. In some implementations, the received instructions are configuration instructions for how and when to distribute data from a data server 140. The configuration instructions may be rather complex. As a result, the data server platform might not behave exactly as intended, and the configuration instructions may require iterative revision ("debugging"). Because the management device 128 is situated in the first network 110a, external to the second network 110b of the data server platform, the management device 128 may be limited in the options available for testing or debugging the configuration instructions. Traditional debugging techniques like examining system memory or testing the instructions in a controlled test environment are likely to be unavailable, due to security protocols, authentication requirements, or any other reason.

Figure 4:
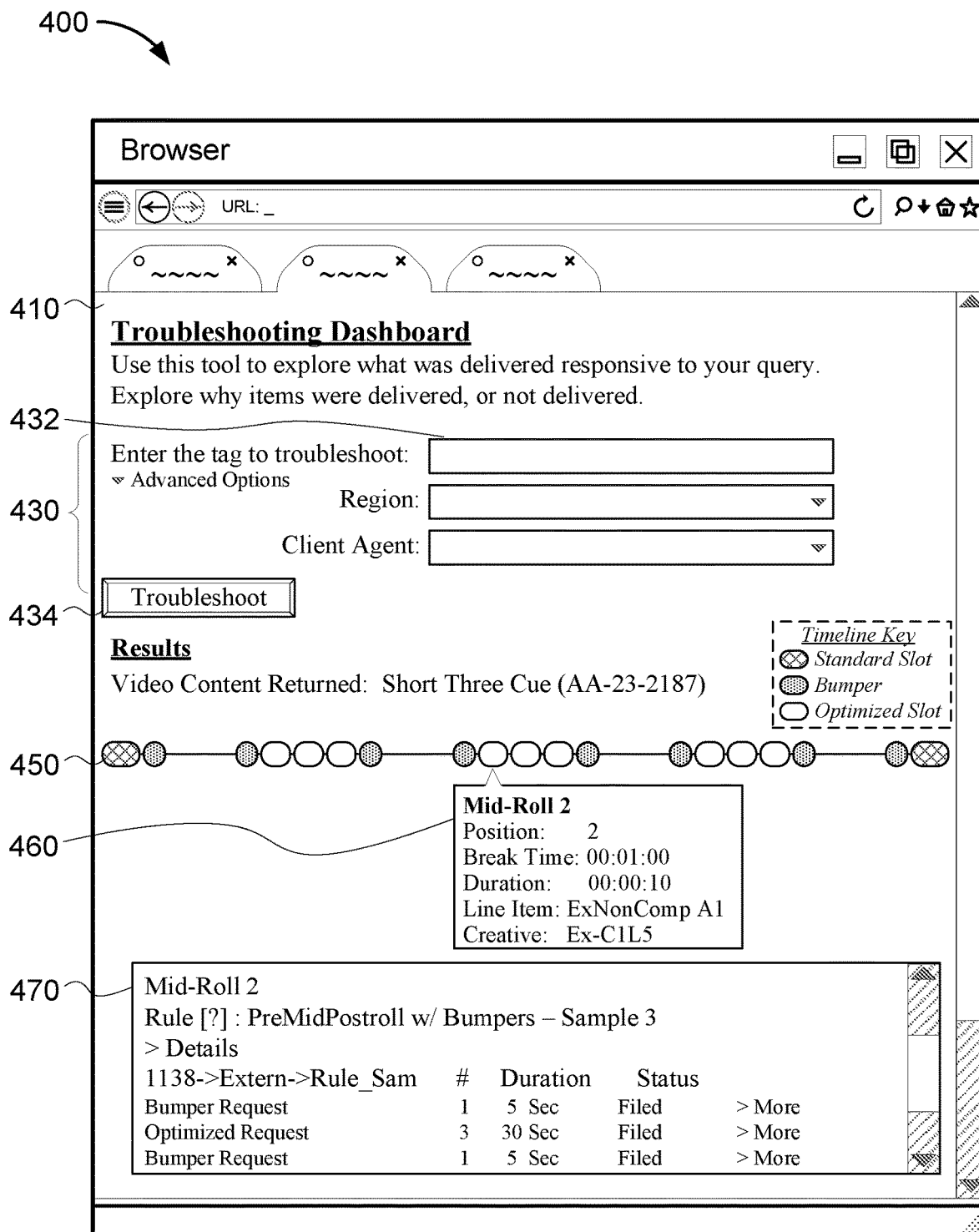
FIG. 4 is an illustration of an example report presented in a web page.

In some implementations, the administrative interface server 180 provides a test functionality facilitating external testing of received configuration instructions. In some implementations, the administrative interface server 180 provides a testing interface to the management device 128 that receives parameterized test requests. The administrative interface server 180 then generates a request satisfying parameters of the parameterized test request and submits the generated request to the data server 140 (or to another back-end server 130 configured for internal tests). The generated request is submitted by the administrative interface server 180 as though it had originated from a specific client device 120 external to the platform's network 110b. In some implementations, the administrative interface server 180 uses an emulated client device to generate the internal test request. In some implementations, the administrative interface server 180 spoofs the request, making it look like it originated at a client device when it did not. The network gateway 118 does not filter the spoofed request (or identify it as a malicious attack) because the request originates within the local network 110b and does not pass through the network gateway 118. Because the request appears to be a real request, the data server 140 responds with real results. However, because the request is known (internally) to be a test request, any statistics aggregation or financial charges the request generates can be blocked or reversed (internally). In some implementations, the interface server 180 then provides a sanitized report to the management device 128 with results for the test request. In some implementations, the results are sanitized to remove internal or confidential information. These features are described in more detail below and an example report is illustrated in FIG. 4.

FIG. 1B is a block diagram of an example computing system 101. The example computing system 101 is suitable for use in implementing the computerized components described herein, in accordance with an illustrative implementation. In broad overview, the computing system 101 includes at least one processor 107 for performing actions in accordance with instructions and one or more memory devices 106 or 109 for storing instructions and data. The illustrated example computing system 101 includes one or more processors 107 in communication, via a bus 105, with memory 106, at least one network interface controller 112 and network interface 111 for connection to a network device 114 (e.g., for access to a network 110), and other components 103, e.g., input/output ("I/O") components 102. Generally, a processor 107 will execute instructions received from memory (e.g., cache 109 or memory 106). The illustrated processor 107 incorporates, or is directly connected to, cache 109. In some instances, instructions are read from memory 106 into cache 109 and executed by the processor(s) 107 from cache 109. In some implementations, instructions are encoded in read only memory ("ROM"), not shown. In some implementations, the client device 120 is implemented using a general purpose computing processor 107. In some implementations, the computing system 101 is implemented using special purpose logic circuitry, e.g., an ASIC. In some implementations, the computing system 101 is implemented using an SoC semiconductor device that includes the processor(s) 107 and one or more additional components, e.g., the network interface controller 112, cache 109, and hardware interfaces to I/O components 102.

In more detail, the processor(s) 107 may be any logic circuitry that processes instructions, e.g., instructions fetched from the memory 106 or cache 109. The computing system 101 may be based on any processor, or set of processors, capable of operating as described herein. The processor(s) 107 may be single core or multi-core processor(s). The computing system 101 may include multiple distinct processor(s) 107. In some implementations, a general purpose processor 107 such as a central processing unit ("CPU") may be augmented with one or more special purpose processors 107, such as a math co-processor or a graphics processing unit ("GPU"). In some implementations, the processor(s) 107 are implemented as circuitry on one or more "chips."

The memory 106 may be any device suitable for storing computer readable data. The memory 106 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto-optical disks, and optical discs (e.g., CD ROM, DVD-ROM, or BLU-RAY discs). A computing system 101 may have any number of memory devices 106.

The cache 109 is generally a form of computer memory placed in close proximity to a processor 107 for fast access times. In some implementations, the cache 109 is memory circuitry that is part of, or on the same chip as, a processor 107. In some implementations, there are multiple levels of cache 109, e.g., L2 and L3 cache layers. In some implementations, multiple processors 117, and/or multiple cores of a processor 117, share access to the same cache 109.

The network interface controller 112 manages data exchanges via the network interface 111 (sometimes referred to as a network interface port). The network interface controller 112 handles the physical and data link layers of the Open Systems Interconnection ("OSI") model for network communication. In some implementations, some of the network interface controller's tasks are handled by one or more of the processor(s) 107. In some implementations, the network interface controller 112 is incorporated into the processor 107, e.g., as circuitry on the same chip. In some implementations, a computing system 101 has multiple network interfaces 111 controlled by a single controller 112. In some implementations, a computing system 101 has multiple network interface controllers 112. In some implementations, each network interface 111 is a connection point for a physical network link (e.g., a cat-5 Ethernet link). In some implementations, the network interface controller 112 supports wireless network connections and an interface 111 is a wireless (e.g., radio) receiver/transmitter (e.g., for any of the IEEE 802.11 WiFi protocols, near field communication ("NFC"), BLUETOOTH, BLE, ZIGBEE, ANT, or any other wireless protocol). In some implementations, the network interface controller 112 implements one or more network protocols such as Ethernet. Generally, a computing system 101 exchanges data with other computing devices via physical or wireless links through a network interface 111. The network interface 111 may link directly to another device or to another device via an intermediary device, e.g., a network device such as a hub, a bridge, a switch, or a router, connecting the computing system 101 to a data network 110 such as the Internet.

The computing system 101 may include, or provide interfaces for, one or more input or output ("I/O") components 102. Input devices include, without limitation, keyboards, touch screens, microphones, foot pedals, inertial measurement units ("IMU"), accelerometers, gyroscopes, tilt-sensors, motion sensors, environmental sensors, Musical Instrument Digital Interface ("MIDI") input devices, and pointing devices such as a mouse or trackball. Output devices include, without limitation, video displays, speakers, haptic feedback devices, refreshable Braille terminals, lights, servos, MIDI output devices such as MIDI synthesizers, and two or three dimensional printers (including, but not limited to, inkjet printers, laser printers, thermographic printers, stereolithographic printers, extrusion deposition printers, and metal sintering printers).

The other components 103 may include an I/O interface, external serial device ports, and any additional co-processors. A computing system 101 may include an interface (e.g., a universal serial bus ("USB") interface) for connecting input devices, output devices, or additional memory devices (e.g., portable flash drive or external media drive). In some implementations, a computing system 101 includes an additional device 103 such as a co-processor. A math co-processor can assist the processor 107 with high precision or complex calculations.

The network device 114 may be a hub, switch, router, modem, network bridge, or any other network node. In some implementations, the network device 114 is the network gateway 118, illustrated in FIG. 1A. In some implementations, the network device 114 is implemented using the computing system 101 illustrated in FIG. 1B with multiple network interfaces 111. In some implementations, the network device 114 (e.g., the network gateway 118) is implemented using customized hardware such as a special purpose processor and/or a ternary content-addressable memory ("TCAM").

In some implementations, the data server 140 implements a protocol that uses special flags to control internal mechanisms, e.g., debugging options. These special flags, when set, may cause the data server to function differently from normal. A request that might ordinarily incur a financial charge might have an optional flag that, if set, would negate the financial charge. Because such a flag could have security consequences if used improperly, devices at the network boundary (e.g., the network gateway 118) may be configured to remove such a flag from packets arriving from outside the server's network. Removing internally-used optional flags at the network boundary also has the advantage of preventing certain malicious attacks on the network. A malicious attack may include the use of packets designed to look as though they originated from a source other than the actual source (this is known as "spoofing.") Filtering packets at the network edge can prevent attacks that rely on such spoofed packets.

Figure 2:
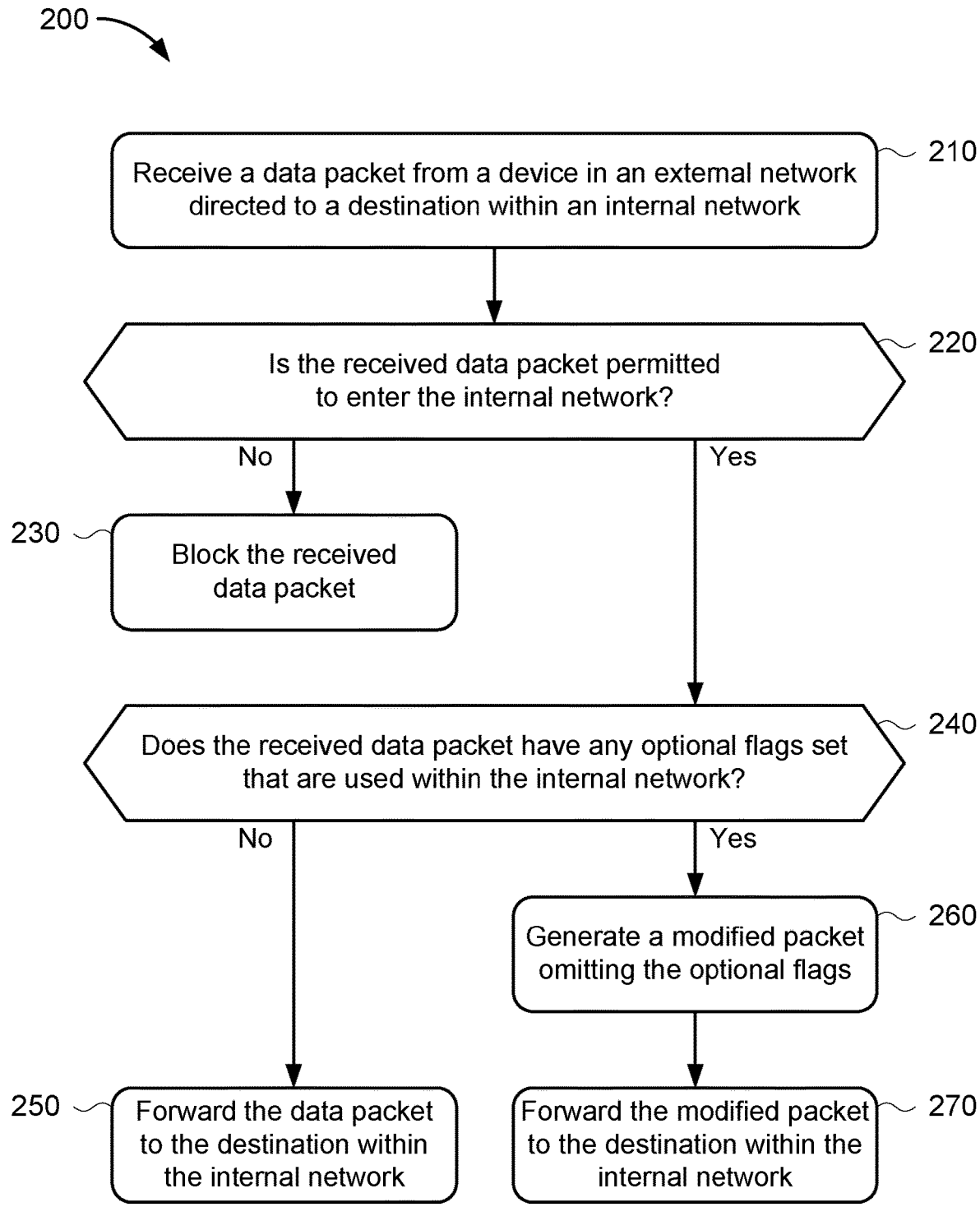
FIG. 2 is a flowchart for an example method of filtering data requests transiting a network boundary.

FIG. 2 is a flowchart for an example method 200 of filtering data requests transiting a network boundary. In brief overview of the method 200, beginning at stage 210, a network boundary device such as the network gateway 118 receives a data packet from a device in an external network directed to a destination within an internal network. At stage 220, the network gateway 118 determines whether the received data packet is permitted to enter the internal network. The data request may be permitted or not permitted for any number of policy reasons, including but not limited to an unauthorized source, a bad format, a suspect header, an unrecognized destination, an invalid port, and so forth. If the network gateway 118 determines that the received data packet is not permitted to enter the internal network, then at stage 230 the network gateway 118 blocks the received data packet. Otherwise, at stage 240, the network gateway 118 checks the received data packet for any optional flags set in the packet that are used within the internal network. The network gateway 118 filters out any custom flags used within the internal network that are not allowed (by policy) to be set by devices external to the network. If the network gateway 118 determines that the received data packet does not include any such flags, then at stage 250, the network gateway 118 forwards the received data packet to the destination (e.g., the data server 140) within the internal network. Otherwise, at stage 260, the network gateway 118 filters the packet, generating a modified packet that omits the optional flags. At stage 270, the network gateway 118 forwards the modified packet to the destination within the internal network.

Referring to FIG. 2 in more detail, at stage 210, the network gateway 118 receives a data packet (e.g., a data request) from a device in an external network (e.g., network 110c) directed to a destination (e.g., a server such as the data server 140) within an internal network (e.g., network 110b). The data packet may be an independent data packet (e.g., a UDP packet) or may be part of a series or stream of packets (e.g., a TCP or SCTP packet). The data packet generally includes a header portion and, in some instances, may include a non-header data portion referred to as the packet payload. Some data packets do not include a formal payload, such as when the header conveys the packet's intent or message on its own. The header portion of the packet includes protocol specific bit values and may include optional flag bit values, depending on the protocol in use. The header portion indicates, among other things, a destination address for the packet. The network gateway 118 receives the packet at a network interface linked to the external network (or to another gateway node) and processes the data packet to identify a "next hop" for the packet, generally corresponding to a network interface linked to a network device within the internal network. Before forwarding the received packed to the identified next hop, the network gateway 118 may process the packet to enforce one or more network policies. In some implementations, the processing attributed herein to the network gateway 118 is performed by an ancillary network appliance not shown.

At stage 220, the network gateway 118 determines whether the received data packet is permitted to enter the internal network. The data request may be permitted or not permitted for any number of policy reasons, including but not limited to an unauthorized source, a bad format, a suspect header, an unrecognized destination, an invalid port, and so forth. In some implementations, the network gateway 118 implements a firewall policy that restricts certain packets from entering the internal network via the network gateway 118.

At stage 230, if the network gateway 118 determines at stage 220 that the received data packet is not permitted to enter the internal network, the network gateway 118 blocks the received data packet. In some implementations, the network gateway 118 blocks the received data packet by "dropping" the packet, i.e., simply failing to forward it. In some implementations, the network gateway 118 actively removes the packet from memory. In some implementations, the network gateway 118 reports the blocked packet to a network monitor. In some implementations, the network gateway 118 generates a log entry regarding the blocked packet.

At stage 240, if the network gateway 118 determines at stage 220 that the received data packet is permitted to enter the internal network, the network gateway 118 checks the received data packet for any optional flags set in the packet that are used within the internal network. The network gateway 118 filters out any custom flags used within the internal network that are not allowed (by policy) to be set by devices external to the network. The received packet may include flags requesting a certain quality of service ("QoS") from the network. An autonomous system is not required to honor the QoS expectations of other networks and may clear QoS flags from arriving packets. Packets may include flags indicating network congestion status, flags indicating a number of hops traveled, and flags specific to various application layer protocols. In some implementations, the network gateway 118 is configured to clears flags in specific application layer protocols, including, e.g., custom protocols implemented by servers operating within the internal network.

At stage 250, if the network gateway 118 determines at stage 240 that the received data packet does not include any optional flags set in the packet that are used within the internal network, the network gateway 118 forwards the received data packet to the destination (e.g., the data server 140) within the internal network. In some implementations, the network gateway 118 forwards the received data packet to a next hop identified according to a routing policy. In some implementations, the network gateway 118 forwards the received data packet by transmitting it on a network interface linked to the next hop.

At stage 260, if the network gateway 118 determines at stage 240 that the received data packet does include an optional flag set in the packet that is used within the internal network, the network gateway 118 filters the packet, generating a modified packet that omits the optional flag. The modified packet generally appears the same as the received data packet, except that bits set for the optional flag are cleared—that is, they are set to a default ("neutral") value, typically 0. The modified packet may be further modified by the network gateway 118. The network gateway 118 may re-calculate a checksum value for the packet and give the modified packet the recalculated checksum value.

At stage 270, the network gateway 118 forwards the modified packet (instead of the originally received packet) to the destination within the internal network. In some implementations, the network gateway 118 forwards the modified data packet to a next hop identified according to a routing policy. In some implementations, the network gateway 118 forwards the modified data packet by transmitting it on a network interface linked to the next hop.

Referring back to FIG. 1A, in the illustrated example network environment 100, the first network, network 110a, hosts a management device 128 used by an account manager or administrator (or other such user) to configure one or more aspects of the data server platform in the second network, network 110b. The management device 128 exchanges data with the administrative interface server 180 (through the network gateway 118) to configure the platform. In some implementations, the administrative interface server 180 provides a web-based interface to the management device 128 that is presented to the account manager, e.g., in a custom application or as a web page in a web browser. Once the account manager or administrator has set up a particular configuration, the account manager or administrator will likely want to test or verify the configuration. However, because the network gateway 118 restricts the data passing into (and out of) the second network (network 110b), as described in reference to FIG. 2, the management device 128 is limited in the types of tests it can run. The management device 128 can submit the same types of requests as any other client device 120, and see the responses. However, such requests may have real-world consequences or impacts, e.g., incurring financial charges. In some instances, to make such requests, the submitted configuration must be committed, and an improper configuration may allow other users to submit requests that will be handled improperly. In some instances, a "real" response to a request may take a significant amount of time and resources. If the request is a request to stream media such as audio or video, the request may result in several megabytes or gigabytes of data being transmitted, requiring minutes or hours to consume. Such requests may be difficult to debug.

Figure 3:
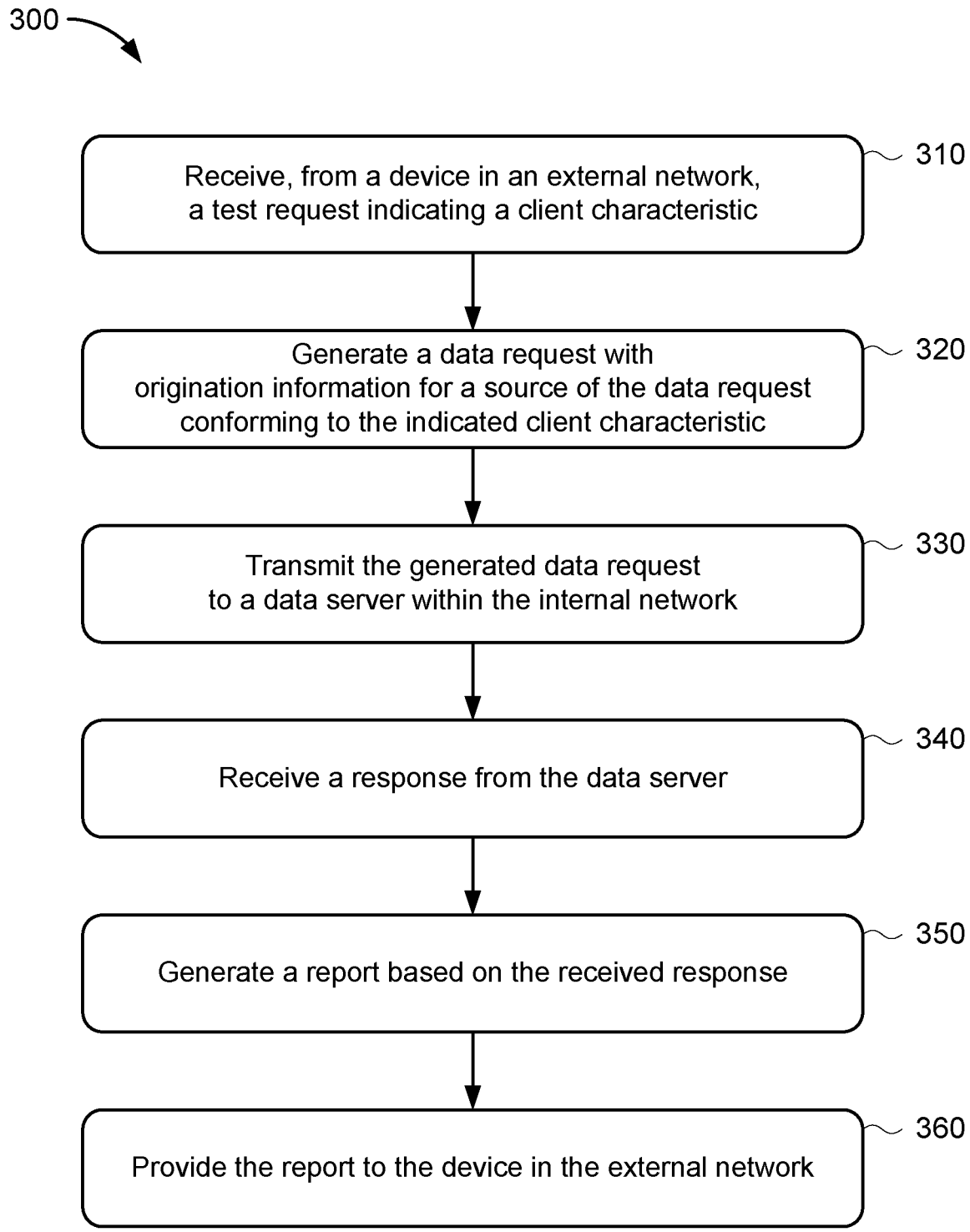
FIG. 3 is a flowchart for an example method of facilitating configuration verification across a network boundary.

FIG. 3 is a flowchart for an example method 300 of facilitating configuration verification across a network boundary. In brief overview of the method 300, beginning at stage 310, an administrative interface server 180 receives, from a device in an external network 110a, a test request indicating a client characteristic. At stage 320, the administrative interface server 180 generates a data request with origination information for a source of the data request conforming to the indicated client characteristic. At stage 330, the administrative interface server 180 transmits the generated data request to a data server 140 within the internal network 110b. At stage 340, the administrative interface server 180 receives a response from the data server 140 and, at stage 350, the administrative interface server 180 generates a report based on the received response. At stage 360, the administrative interface server 180 provides the report to the device in the external network 110a.

Referring to FIG. 3 in more detail, at stage 310, an administrative interface server 180 receives, from a device in an external network 110a, a test request indicating a client characteristic. The test request received by the administrative interface server 180 at stage 310 is a request to simulate a data request originating from a client device having the indicated client characteristic. The test request originates from a device in an external network 110a, e.g., a management device 128, and passes through the network gateway 118 into the local internal network 110b. The requesting device, i.e., the management device 128, does not necessarily conform to the indicated client characteristic; the management device 128 may be completely different from the client device described by the indicated client characteristic. The test request may indicate one or more client characteristics. In some implementations, the test request may include indicators corresponding to multiple different clients, e.g., in a request to generate multiple tests. In some implementations, the test request includes request-specific information such as a URL to be requested in the test or an identifier for data to be requested in the test.

The client characteristic is a feature of a client (e.g., a client device 120) that might submit an actual request to be tested. The feature may be an identifier for a device manufacturer, make, or model. The feature may be an identifier for an operating system of the client device. An identifier for an operating system may identify the operating system type, manufacturer, vendor, build number, version, compile date, and/or any other variable differentiating between operating systems. The feature may be an identifier for a software application executing on the client device that might submit the request. The software application could be a web browser, a media viewer, a document viewer, an e-mail application, or a custom application. An identifier for the software application may identify the application type, manufacturer, vendor, build number, version, compile date, and/or any other variable differentiating between software applications. In some implementations, a client device 120 may have recorded thereon a unique identifier (e.g., a value stored in a cookie, a value stored in a mobile device subscriber identification module ("SIM") card, a media access control ("MAC") address, or some other unique identifier) and the client characteristic feature may be a value for the unique identifier. In some implementations, the client characteristic feature is a source address, e.g., an IP address. In some implementations, the client characteristic feature is a geographical location, e.g., a region code, a legal jurisdiction identifier, an address, coordinate values (e.g., latitude and longitude), a time zone, etc. In some implementations, the client characteristic feature is a value associated with a limitation filter such as an age or institutional affiliation (e.g., a school or place of employment).

In some implementations, the indicator of the client characteristic is a specific value for the client characteristic. In some implementations, the indicator is a data structure that includes one or more values for one or more client characteristics. In some implementations, the indicator is in a markup language such as Extensible Markup Language ("XML"). In some implementations, the indicator is a code corresponding to a specific value for the client characteristic or a set of values for respective client characteristics. In some implementations, there are a predetermined number of possible client devices and the code is an identifier for one of the predetermined possible client devices.

At stage 320, the administrative interface server 180 generates a data request with origination information for a source of the data request conforming to the indicated client characteristic. The administrative interface server 180 (or another back-end server 130 at the direction of the administrative interface server 180) generates a simulated data request that is made to look as though it originated from a client device that has the same characteristics (features, properties, operating system, software, etc.) as the client characteristics indicated by the request received by the administrative interface server 18 in stage 310. In some implementations, the test request is a spoofed packet or set of packets. In some implementations, the administrative interface server 180 (or another back-end server 130 at the direction of the administrative interface server 180) executes a simulation of the client device and causes the simulated client device to generate the date request. In some implementations, a back-end server 130 includes a hypervisor for a virtualized client device conforming to the indicated client characteristic and the administrative interface server 180 causes the virtualized client device to generate the request. In some implementations, the administrative interface server 180 directly generates the request, populating source identification in the request with data indicating that the request originated from a client device conforming to the indicated client characteristic.

In some implementations, at stage 320, the administrative interface server 180 generates the data request with one or more flags that designate the data request as a test request. In some implementations, the flags are optional flags. The network gateway 118 is configured to prevent devices in external networks (e.g., the network 110a or the network 110c shown in FIG. 1A) from transmitting packets to devices within the internal network 110b with the one or more flags set. In some implementations, the network gateway 118 is configured to remove the flags from incoming packets (i.e., packets arriving from an external network). In some implementations, the network gateway 118 is configured such that if the flags are present in an incoming packet, the network gateway 118 blocks the incoming packet. In some implementations, the flags are a single bit in a header field of a request packet, e.g., an optional bit in the TCP protocol. In some implementations, the flags are values in a custom application layer protocol.

At stage 330, the administrative interface server 180 transmits the generated data request to a data server 140 within the internal network 110b. In some implementations, the administrative interface server 180 directs or causes another back-end server 130 to transmit the generated data request to the data server 140. In some such implementations, the administrative interface server 180 transmits the generated data request to the data server 140 using a standard OSI layer-4 transport protocol such as UDP, TCP, or SCTP. In some implementations, the administrative interface server 180 transmits the generated data request to the data server 140 using a custom protocol, e.g., an application later protocol layered on UDP, TCP, or SCTP. The administrative interface server 180 transmits the generated data request to the data server 140 without the request passing through the network gateway 118.

At stage 340, the administrative interface server 180 receives a response from the data server 140. In some implementations, the response is identical to a response the data server would send to any client device (conforming to the indicated client characteristic) responsive to a corresponding data request. In some implementations, the administrative interface server 180 may spoof an external address or provide a virtual internet protocol address that appears to be from an external client, such that the administrative interface server 180 may transmit a request that appears to be from a client device external to the network, and receive from the data server 140 a response directed to the client device external to the network (internal network routers nonetheless routing the packet to the administrative interface server 180).

In some implementations, the data server 140 is configured to recognize that the request is a test request. In some implementations, the request carries one or more flags indicating that it is a test request and the data server 140 recognizes the flags. In some implementations, the data server 140 recognizes that the source address for the request is from within the internal network 110*b*.

In some implementations, when the data server 140 identifies a request as a test request, the response generated is not identical to a response the data server would send to any client device (conforming to the indicated client characteristic) responsive to a corresponding data request, and is instead a data set descriptive of what the response would have looked like had it been from the client device. If the request is a request for media stream (e.g., an audio stream or a video stream), an actual response would consume significant resources. Instead, in some such implementations, the data server 140 may respond with a manifest detailing what data sources would be used to present the media stream and at what times during the presentation each source would be presented. In some implementations, when the data server 140 identifies a request as a test request, the response generated is identical to a response the data server would send to any client device (conforming to the indicated client characteristic) responsive to a corresponding data request.

In some implementations, when the data server 140 identifies a request as a test request, the data server 140 processes the request as a normal request. In some implementations, when the data server 140 identifies a request as a test request, the data server 140 processes the request as a normal request, but does not update internal statistics or counters. That is, the data server 140 prevents the request from being counted as a real request. In some implementations, while processing the request, the data server 140 may access additional resources within the internal network. In some implementations, the data server 140 provides an indication to each accessed resource that the access is for a test. In some implementations, the data server 140 prevents any financial transaction from occurring responsive to a request identified as a test request.

In some implementations, the data server 140 is not notified that a request is a test request, and the data server 140 handles the request exactly as it would any other request. In some such implementations, the administrative interface server 180 reverses any impact that the request may have had. If the request causes a counter to be incremented (or decremented) or otherwise impacts a statistic measurement, the administrative interface server 180 causes the impact to be reversed, e.g., decrementing (or incrementing) the counter to undo the impact of the request. If a request causes a financial transaction, the administrative interface server 180 reverses the transaction so that no fee is incurred.

At stage 350, the administrative interface server 180 generates a report based on the received response. An example of such a report is illustrated in FIG. 4, described below. In some implementations, the report provides specific details about the response generated by the data server 140 that would not be apparent to a client device receiving the response. In some implementations, the report may include metadata such as file names and file sizes associated with the response. In some implementations, the report may include data specific to how the response was generated. In some implementations, the request to the data server 140 may cause the data server 140 to conduct an instant auction. A client receiving the response from the request would not receive any information about the instant auction, but the administrative interface server 180 may include information about the instant auction in the report. The information may include, e.g., how many competitors participated in the auction, an average bid in the auction, and where a specific participant (e.g., an auction participant associated with the management device 128) placed in the auction if the specific participant did not win. In some implementations, the information about the auction is filtered or sanitized to avoid disclosing third-party information or information about competing companies.

At stage 360, the administrative interface server 180 provides the report to the device in the external network 110*a*. In some implementations, the administrative interface server 180 provides the report to the management device 128 in the form of a web page or set of web pages for presentation at the management device 128 by a browser application or by a custom application. An example of such a report is illustrated in FIG. 4, described below.

In some implementations, the data server 140 provides video or multi-media data streams. The streamed data may include content from different sources, e.g., content for a first media feature and content for additional media added in, e.g., advertisements. The configuration settings may control how and when certain content is added to the video or multi-media data stream. In a typical scenario, a client device 120 submits a request for presentation of a media stream with a specific content, and the data server 140 responds by starting a media stream of the specific content. The media stream provided by the data server 140 may include additional content, e.g., an introduction section, a first portion of the specific content, a promotional interruption, a second portion of the specific content, and so on. If the requested specific content is long, such as a movie, the request could take hours to complete. To test a configuration used to select the various content in the media stream using a standard request would thus also take hours. However, typically, the important aspect of the response can be reduced to just a manifest detailing what data sources would be used to present the media stream and at what times during the presentation each source would be presented. Analysis of the manifest can be completed significantly faster than consuming hours of media content. Additionally, the resources required to serve that media content can be preserved for production use when the manifest is sufficient to validate a configuration. This may significantly reduce bandwidth and processing use, making the system more efficient and able to serve large numbers of real and test requests simultaneously.

FIG. 4 is an illustration of an example report 400 presented in a web page 410. In brief overview of FIG. 4, the report 400 is presented in a web page 410. The illustrated example web page 410 includes a user interface section 430, with data entry fields 432 and a submission button 434 (labeled "Troubleshoot"). The illustrated example web page 410 includes a timeline 450, with a details section 460 identifying characteristics of an element on the timeline 450. The illustrated example web page 410 also includes a results panel 470 with additional extensive detail about the results. An administrative user can explore the results to see what would have happened had the test request been a real request.

Referring to FIG. 4 in more detail, the report 400 is presented in a web page 410.

The illustrated example web page 410 includes a user interface section 430, with data entry fields 432 and a submission button 434. An account manager, at a management device 128, can populate the data entry fields 432 with data to create the test request. The account manager can designate particular request instructions and client device characteristics. The data entry fields 432 may include, e.g., fields for a uniform resource locator ("URL") to be requested in the test, a URL for data that is expected to be in the response, client device characteristics such as hardware features, software features, or locality, and a simulated date or time of day for the test request. The data entry fields 432 illustrated in the user interface section 430 are provided as examples, and are not meant to be limiting. The illustrated example data entry fields 432 are labeled "tag to troubleshoot," "region," and "client agent." In some implementations, one or more of the data entry fields 432 are text fields. In some implementations, one or more of the data entry fields 432 are drop down menus with pre-selected options. In some implementations, one or more of the data entry fields 432 are menus that pop-up additional interfaces.

The illustrated user interface section 430 includes a submission button 434 (labeled "Troubleshoot"). When the account manager is ready to submit the test request, the account manager interacts with the interface, tapping, clicking, or otherwise selecting the submission button 434. After selecting to submit the test, the interface provides results for the test. In some implementations, the user interface section 430 is included with the provided results, e.g., populated with the request specifics for easy editing. This can facilitate subsequent tests.

The illustrated example web page 410 includes a timeline 450 and a details section 460 identifying characteristics of an element on the timeline 450. In the test illustrated, the result of the test is presentation of a video content item with an introduction section, an epilogue section, and three intervening sections that each have five sub-sections. Each section is represented in a manifest. A timeline 450 visually illustrates the manifest. In some implementations, the timeline 450 is interactive. An account manager may select an element on the timeline 450 and the interface responds by presenting details section 460 identifying characteristics of an element on the timeline 450.

The illustrated example web page 410 includes a results panel 470 with additional extensive detail about the results. In some implementations, the manifest is returned in its entirety in a results panel 470. In some implementations, the results panel 470 is a scrollable view window within the results web page 410. In some implementations, the results panel 470 is a section of the results web page 410 itself. In some implementations, some portions of the manifest are modified by the administrative interface server 180, e.g., removing names of competitors or removing internal address information. In some implementations, the presented results panel 470 includes placeholder ("dummy") information in place of the removed information. In some implementations, the presented results panel 470 includes redaction symbols in place of the removed information, e.g., a string of Xs or a black line.

Using these tools, an account administrator (i.e., a third party distinct from the data server platform) can submit content for distribution and configure a policy for distribution of the content, using a management device 128 interacting with an administrative interface server 180. The account administrator can then submit, using the management device 128, a request to test the configured policy with respect to one or more particular presentation scenarios. The account administrator may expect the submitted content to be presented with a second content item but not with a third content item. Each request specifies the scenario (e.g., a request for the second content item and a separate request for the third content item) and also specifies parameters (e.g., that the request is to test presentation on a specific client device 120 such as on small-screen mobile devices or on large-screen attached gaming devices). The administrative interface server 180 then generates spoofed or simulated requests and sends them to the data server 140 for testing. The test requests stay within the internal network 110b, so the fact that the management device 128 in use is in an external network 110a does not present a security or confidentiality problem. Only data that is authorized to leave the internal network 110b is provided to the management device 128. The administrative interface server 180 checks the request and the response and provides a report to the management device 128. The account administrator can then revise the policy configuration as needed, until everything is correct and satisfactory.

In at least one aspect, described is a method of testing a configuration across a secured network edge. The method includes receiving, by a first server comprising a processor within a first network, a test request from a management device to test a set of data delivery rules, the test request indicating a client characteristic, the management device communicating the test request to the first server via a second network separated from the first network by a network boundary device. The method includes generating, by the first server, a data request with origination information for a source of the data request conforming to the indicated client characteristic and transmitting the generated data request to a second server within the first network responsive to receiving the test request from the management device. The method includes receiving, by the first server from the second server, a response to the generated data request and providing, to the management device in the second network, a report based on the received response.

In at least one aspect, described is a system for testing a configuration across a secured network edge. The system includes a first server comprising a processor and a network interface to a first network bordered by the network boundary device, the processor configured to execute instructions to receive a test request from a management device to test a set of data delivery rules, the test request indicating a client characteristic, the management device communicating the test request to the first server via a second network separated from the first network by a network boundary device. The processor is further configured to generate a data request with origination information for a source of the data request conforming to the indicated client characteristic and transmit the generated data request to a second server within the first network responsive to receiving the test request from the management device. The processor is further configured to receive, from the second server, a response to the generated data request and provide, to the management device in the second network, a report based on the received response.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus (including, e.g., a processor 107). A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer-executable instructions, in a non-transitory form.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

A user may opt in or out of allowing remote servers to identify and store information about the user and/or about devices operated by the user. The user may opt in to receiving third-party content selected based on apparent relevance to the user. In some implementations, a device identifier is associated with a particular instance of a client application (e.g., running on client device 120). In some implementations, the user may be represented using a randomized device identifier (e.g., a cookie, a device serial number, etc.) that contains no personally-identifying information about the user. Information relating to the user's name, demographics, etc., may not be used by a remote server unless the user opts in to providing such information. Thus, the user has control over how information is collected about him or her and used by a remote server or other content source. Some information that may be associated with the user, or with an anonymized token representative of the user, may include events, such as one or more queries, one or more clicks, browser history data (e.g., the URLs visited, the number of URLs viewed, URL visit durations, etc.), etc.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A method comprising:
   receiving, by a data processing system from a first device, a first request indicating a client characteristic to determine whether at least one of a first set of content items is selected for display in response to requests originating from devices having the client characteristic;

generating, by the data processing system, a second request for content that simulates a data request originating at a client device with the client characteristic indicated in the first request;

determining, by the data processing system, whether a response to the generated second request includes a content item included in the first set of content items; and providing, by the data processing system to the first device, a report based on the response indicating whether or not any content item included in the first set of content items was selected in response to the generated second request.

2. The method of claim 1, further comprising:
executing, by the data processing system, a client device simulation conformant with the indicated client characteristic; and
causing the client device simulation to transmit the second request.

3. The method of claim 1, wherein the second request is to test data delivery rules, wherein the data delivery rules are parameters for selecting content for delivery to a client device.

4. The method of claim 1, further comprising parsing the response and generating the provided report based on the parsed response.

5. The method of claim 1, further comprising:
including, by the data processing system, a data element within the second request, the data element indicating that the second request is a test request.

6. The method of claim 1, wherein the data processing system is configured to record data for each request received, and the data processing system is configured to not record data for test requests received with a data element indicating that the transmitted data request is a test request.

7. The method of claim 1, wherein the response to the generated second request includes a manifest detailing one or more elements of a production response to the second request; and further comprising:
receiving the manifest;
parsing the received manifest; and
generating the provided report based on the parsed manifest.

8. The method of claim 7, further comprising generating the provided report to include, in the provided report, a modified version of the received manifest.

9. The method of claim 1, further comprising receiving, by the data processing system, a set of data delivery rules.

10. A system, comprising:
a data processing system comprising one or more processors and a network interface, the one or more processors configured to execute instructions via the one or more processors to:
receive, from a first device, a first request, the first request indicating a client characteristic to determine whether at least one of a first set of content items is selected for display in response to requests originating from devices having the client characteristic;
generate a second request for content that simulates a data request originating at a client device with the client characteristic indicated in the first request;
determine whether a response to the generated second request includes a content item included in the first set of content items; and
provide, to the first device, a report based on the received response indicating whether or not any content item included in the first set of content items was selected in response to the generated second request.

11. The system of claim 10, wherein the one or more processors are further configured to:
simulate a client device conformant with the indicated client characteristic; and
cause the simulated client device to generate and transmit the second request.

12. The system of claim 10, wherein the second request is to test data delivery rules, wherein the data delivery rules are parameters for selecting content for delivery to a client device.

13. The system of claim 10, wherein the one or more processors are further configured to parse the response and generate the provided report based on the parsed response.

14. The system of claim 10, wherein the one or more processors are further configured to include, within the second request for content, a data element indicating that the second request for content is a test request.

15. The system of claim 10, wherein the one or more processors are configured to record data for each request received, and the one or more processors are configured to not record data for test requests received with a data element indicating that the transmitted data request is a test request.

16. The system of claim 10, wherein the response to the generated second request for content received by the one or more processors includes a manifest detailing one or more elements of a production response to the generated second request for content; and wherein the one or more processors are further configured to:
receive the manifest;
parse the received manifest; and
generate the provided report based on the parsed manifest.

17. The system of claim 16, wherein the one or more processors are further configured to generate the provided report to include, in the provided report, a modified version of the received manifest.

18. The system of claim 10, wherein the one or more processors are further configured to receive a set of data delivery rules.

19. A non-transitory computer-readable medium storing instructions that cause one or more processors executing the instructions to:
receive a first request from a first device, the first request indicating a client characteristic to determine whether at least one of a first set of content items is selected for display in response to requests originating from devices having the client characteristic;
generate a second request for content that simulates a data request originating at a client device with the client characteristic indicated in the first request;
determine whether a response to the generated second request includes a content item included in the first set of content items; and
provide, to the management device in the second network, a report based on the received response.

20. The non-transitory computer-readable medium of claim 19, further storing instructions that cause the one or more processors executing the instructions to include within the second request a data element indicating that the second request is a test request.

* * * * *